UNITED STATES PATENT OFFICE.

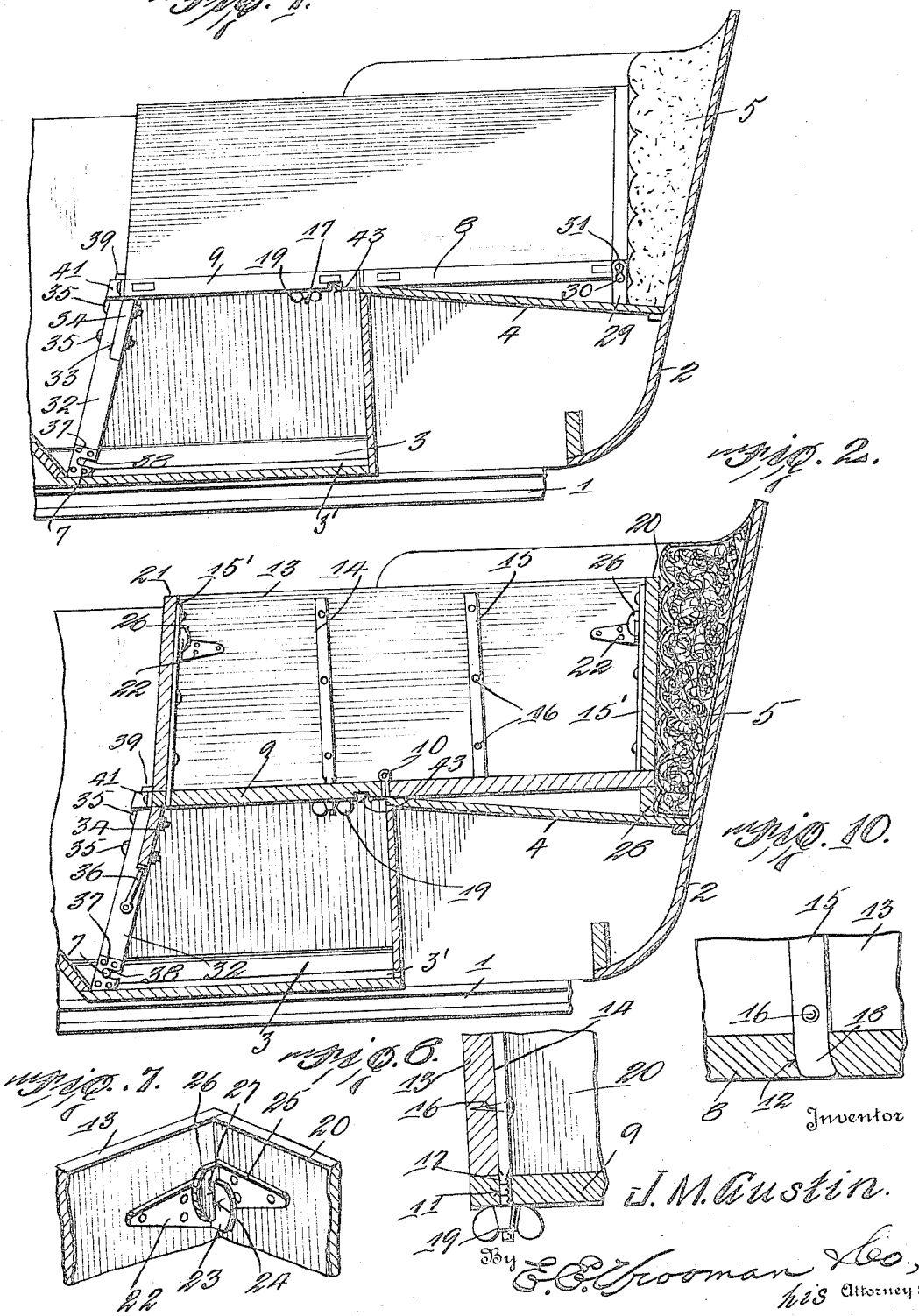

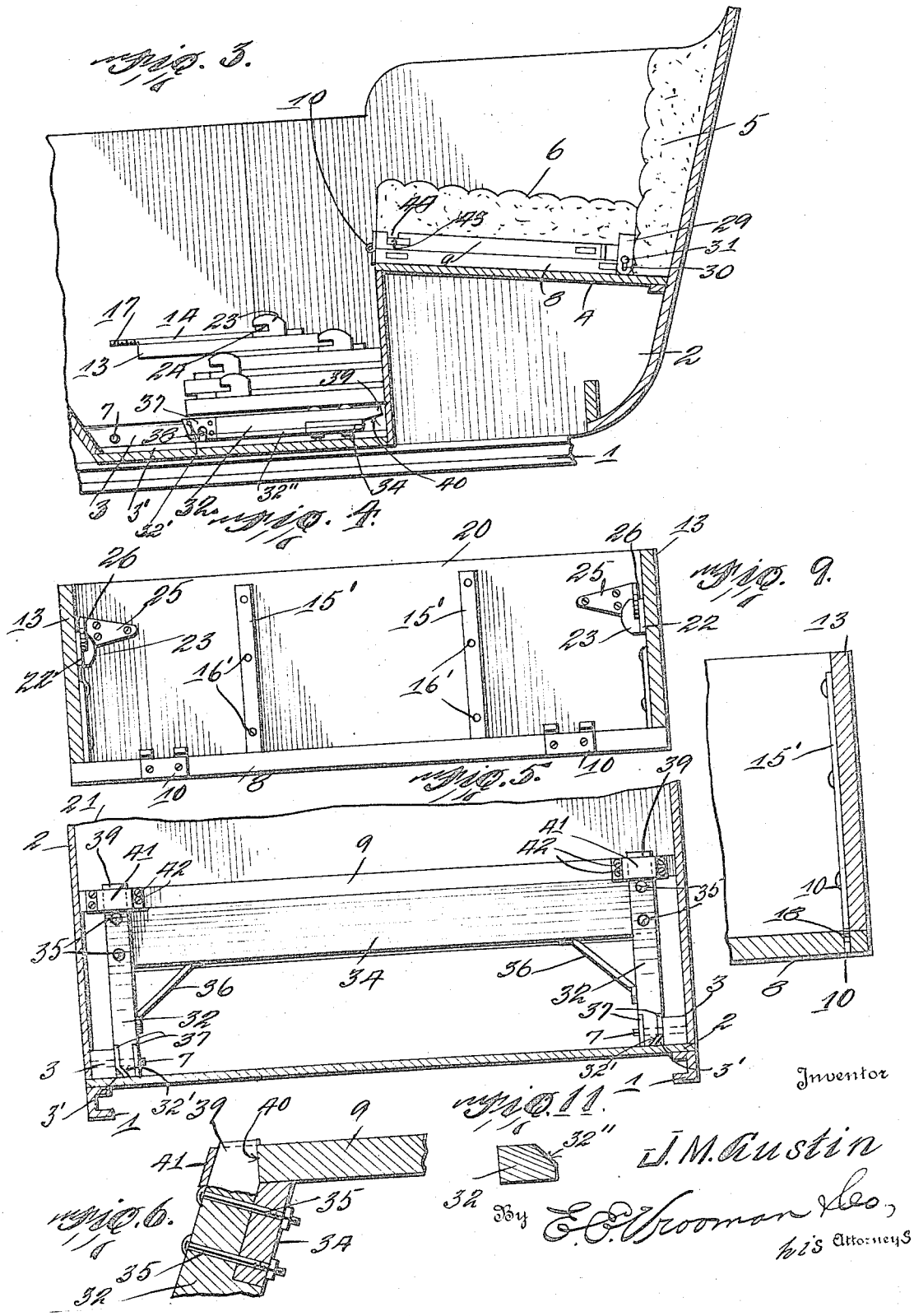

JOHN MORTIMER AUSTIN, OF CUDDEBACKVILLE, NEW YORK.

AUTOMOBILE BODY AND SEAT.

1,238,480.     Specification of Letters Patent.     Patented Aug. 28, 1917.

Application filed August 4, 1916. Serial No. 113,175.

*To all whom it may concern:*

Be it known that I, JOHN M. AUSTIN, a citizen of the United States of America, residing at Cuddebackville, in the county of Orange and State of New York, have invented certain new and useful Improvements in Automobile Bodies and Seats, of which the following is a specification, reference being had therein to the accompanying drawing.

This invention relates to automobile bodies and seats and has for its principal object the production of a structure which is capable of being converted from an automobile ordinarily used as a passenger carrying vehicle to one which is adapted to be used commercially for carrying merchandise, or other articles of like nature.

Another object of this invention is the production of a knock-down body which is removably carried within the body of an automobile, so that when it is desired to carry articles of various natures the knock-down body may be assembled and retained in a correct position for accomplishing this function, although when it is desired to use the automobile as a passenger carrying vehicle, the knock-down body may be disassembled, and positioned so as to assume a compact condition, thus being out of the way, and allowing the automobile to be used in a normal manner.

Another object of this invention is the production of a knock-down receiving body, wherein the sides are removably fitted upon a foldable bottom so as to permit the body to carry articles when the same is in a set-up position.

A still further object of this invention is the production of a knock-down body wherein simple and efficient means are provided for holding the body in an assembled condition, while supporting means are also provided for efficiently and properly holding the knock-down body in a correct position.

With these and other objects in view this invention consists of certain novel combinations, constructions, and arrangements of parts as will be hereinafter fully described and claimed.

In the accompanying drawings:—

Figure 1 is a side elevation of the knock-down body, as constructed in accordance with this invention, illustrating the same carried within the body of an automobile, the latter being shown in section.

Fig. 2 is a central longitudinal section through the knock-down body in an assembled condition, as carried within an automobile body, the latter being shown in section.

Fig. 3 is a longitudinal section through the rear portion of an automobile body, showing the knock-down body in a disassembled condition, as the same is carried if the automobile is being used as a passenger carrying vehicle.

Fig. 4 is a transverse sectional view through the central portion of the knock-down body.

Fig. 5 is a fragmentary front elevation of the knock-down body, illustrating the manner in which the same is supported, and showing the same carried within an automobile body, which is shown in section.

Fig. 6 is an enlarged detail sectional view of the forward portion of the knock-down body and of the supporting frame, illustrating how the supporting frame is connected to the body.

Fig. 7 is a fragmentary detail perspective view of a portion of the knock-down body, illustrating how one of the ends and one of the sides are connected together.

Fig. 8 is a fragmentary enlarged sectional view through a portion of the knock-down body, illustrating the manner in which the sides are secured to the bottom of the body.

Fig. 9 is an enlarged fragmentary elevation, partly in section, of one of the sides of the body, showing the auxiliary retaining means for the side.

Fig. 10 is a section taken on the line 10—10 of Fig. 9.

Fig. 11 is a transverse section taken through one of the supporting standards to illustrate the beveled corner thereof.

Referring to the accompanying drawings by numerals it will be seen that the invention is adapted to be used in connection with an ordinary automobile body, wherein the usual side beams 1 are employed for supporting the body 2 of the automobile which, in turn, has the inner side beams 3 adjacent its lower portion. This automobile body 2 is, of course, provided with a seat 4 having a cushion back 5 and a seat cushion 6. It will further be seen that pins 7 are carried by the side beams 3 for purposes to be hereinafter set forth. While the description of the automobile body as above presented is rather specific it is, of course, obvious that this invention is adapted to be used in connection with passenger carrying automobiles of any sort, for it is capable of being used in connection therewith irrespective of their particular make.

The knock-down body which comprises the invention comprises a bottom formed of sections 8 and 9. These sections 8 and 9 are hingedly secured along two side edges thereof by means of hinge members 10 so as to be foldably connected to each other. These sections 8 and 9 are provided with openings 11 and 12 formed adjacent a plurality of the side edges thereof, as shown in Figs. 8 to 10 inclusive. The sides 13 have metallic strips 14 and 15 secured thereto, by means of the tacks or other securing members 16 so as to be fixedly mounted upon the sides 13. The lower ends of the metallic strips 14 are provided with threaded necks 17 depending therefrom, which are adapted to be passed through the openings 11 formed in the section 9 of the bottom, while the metallic strip 15 is provided with a projection 18 which is adapted to be passed into the opening 12 of the section 8. After this action has taken place a wing nut 19 is screwed upon the threaded neck 17 of the metallic strip 14 thereby fixedly holding the particular side from being accidentally lifted from engagement with the two sections 8 and 9 of the bottom. It is quite obvious, however, that as the neck 17 fits within the openings 11 and the projection 18 fits within the opening 12 the particular side will be held against side or longitudinal movement under any condition. Thus, because of the fitting of these necks and projections within the openings and the positioning of the screws upon the necks it will be seen that the two sides will be removably held in a fixed engagement with the bottom when the knock-down body is in use.

The ends 20 and 21 are provided with metallic strips 15' secured thereto by tacks or other securing members 16', and these metallic strips 15' operate in all respects similar to the operation of the metallic strips 15 used upon the sides 13. Thus, it will be seen that since the ends 20 and 21 fit between the inner side portions of the sides 13 they will be held against side movement, while the strips 15' will hold the ends against forward or rearward movement.

In order to more positively hold the ends in a releasable engagement with the sides 13 the sides are provided with plates 22 having side extensions 23, in which there are formed notches 24. Plates 25 are carried upon the ends 20 and 21 and also have extensions 26 provided with notches 27, whereby the extensions 23 and 26 may interlock by the fitting of the notches upon each other, thus fixedly reinforcing the upper portions of the sides and ends and holding the same in engagement with each other. From the foregoing description it will be seen that by the use of the metallic strips having threaded necks which receive the wing nuts and having projections fitting within the openings, and also by the interlocking engagement of the plates carried upon the sides and ends the knock-down body will be efficiently held in a set-up position for use.

In order to support the knock-down body in a horizontal plane it will be seen that the cushion 6 of the seat 4 is removed for permitting the bottom of the knock-down body to be positioned upon the seat 4, as shown in Figs. 1 and 2. The sub-sill 28 has plates 29 formed upon its ends, and these plates 29 have slots 30 formed therein through which the pins 31 carried by the section 8 of the body extend. When the knock-down body is in use the sub-sill 28 is swung because of the pivoting of the plates 29 upon the pins 31 so as to fit under the rear end of the section 8 of the bottom, whereby this end of the bottom may rest upon the sub-sill and since the sub-sill will rest upon the rear seat 4 the section 8 will be efficiently supported.

The supporting frame used at the forward end of the knock-down body comprises supporting standards 32 which are notched as shown at 33 so as to receive the end portions of the sub-sill 34. This sub-sill 34 extends in a substantially horizontal plane so as to connect the two supporting standards 32 to each other in parallel spaced relation. The bolts 35 pass through the supporting standards 32 and the sub-sill 34 for fixedly holding the sub-sill upon the supporting standards. The braces 36 are connected in any suitable manner to the sub-sill 34 and the supporting standards 32 for further efficiently reinforcing the sub-sill. The lower ends of the supporting standards 32 are provided with plates 37 fixedly secured thereto in any suitable manner in which there are formed the slots 38. These slots 38 are adapted to receive the pins 7 carried by the side beams 3, whereby the supporting standards 32 will be held from slipping and because of the fact that they fit against the inner portions of the side beams 3 it will be seen that the supporting frame will be held against accidental side movement. The upper ends of the supporting standards 32 are provided with projections 39 which are beveled upon one side, as indicated at 40, to provide wedge-like projections which extend above the upper portion of the sub-sill 34. U-shaped brackets 41 are secured by means of screws or other securing members 42 to the forward end of the section 9 of the bottom. After the pins 7 have been passed into the slots 38 it will be seen that the supporting frame is then in condition to be secured to the forward end of the knock-down body. At this time the wedge-like projections 39 of the supporting standards 32 are passed into the brackets 41, as shown clearly in Figs. 5 and 6 so as to cause the sub-sill 34 to extend entirely across the forward end of the section 9 and thereby support the forward end of the knock-down body. It will be seen that by having the projections 39 wedge-like in construction they will be held against accidentally releasing the brackets since they will be wedged therein, and, accordingly, when the knock-down body is in use it will be efficiently supported at its forward and rear ends, and at its central portion.

When it is desired to remove the knock-down body so as to permit the automobile to be used as a passenger carrying structure the wing nuts 19 may be removed at which time the ends are lifted from engagement with the sections of the bottom and also with the sides, and after this action the sides may also be removed. The section 9 of the bottom may be swung so as to disengage the wedge-like projections 39 of the supporting standards 32 so as to cause the section 9 to be swung thereon and rest upon the top of the section 8, as shown clearly in Fig. 3. After this action has taken place it will be seen that the sub-sill 28 may be swung around so as to extend as shown in Fig. 3, at which time the plates 29 may be moved so as to cause the pins 31 to rest within the lower portions of the slots 30. After this action has taken place it will be seen that the rear end of the section 8 of the body will be supported above the seat 4 and, consequently, will rest snugly upon the seat, and as the section 9 will be resting snugly upon the section 8 it will be seen that the two sections will extend in an inclined position, as shown in Fig. 3, for permitting the seat cushion 6 to be placed thereon. It will be seen that the section 9 is provided with a transverse groove 43 extending thereacross adjacent its pivot portion so that when the two sections are folded to a closed position the groove 43 will be in a position to receive the extension 44 of the seat cushion 6 and in this manner it will be seen that the seat cushion will be fixedly held from shifting when in use in any direction. After the seat cushion has been placed upon the folded sections of the bottom it will be seen that the sides and ends of the knock-down body may be placed upon each other in a knock-down condition, as shown in Fig. 3, and may be placed wherever convenient so as to be out of the way, or, if it is so desired it is quite obvious that any suitable receptacle may be employed for the reception of the knock-down body.

From the foregoing description it will be seen that a very simple and efficient commercial body has been provided which is of a knock-down structure capable of being assembled very quickly and supported rigidly and efficiently in its correct position for receiving articles of merchandise, or any other articles desired, although when it is desired to use the automobile body in which the knock-down body is placed as a passenger carrying vehicle the sides and ends may be easily removed, while the sections of the body may be easily folded to a closed position, so as to permit the automobile to be used as desired.

It will be noted that the lower ends of the standards 32 are beveled inwardly as at 32' to provide sufficient space for the inward bending of the outer plates 37, as shown in Fig. 5, whereby sufficient space is provided for the accommodation of the usual molding 3' carried upon the flooring and adjacent the side beams 3 of the automobile body. The standards 32 are further provided with beveled corners 32" so that when the device is disassembled the supporting frame may be swung downwardly to rest upon the flooring of the automobile, while the beveled corners 32" of the standards will provide sufficient space for the accommodation of the molding 3'. It will further be seen that since the projections 18 of the metallic strips 15' are bent slightly rearwardly, as shown in Fig. 10, the sides may be swung downwardly from their rear ends toward their forward ends which action will cause the projections 18 to first pass into the openings 12 after which the threaded necks 17 will pass into the openings 11.

What is claimed is:—

1. In a device of the class described, the combination of a bottom comprising a pair of hingedly connected sections, sides and ends removably carried upon said bottom, said device being adapted to be positioned within the body of an automobile for constituting an article carrier, a sub-sill having end plates formed thereon, said end plates having slots formed therein, pins carried by said bottom and passing through said slots, whereby said sub-sill will be pivotally mounted upon said bottom, whereby said sub-sill may be swung under one end of said bottom for releasably supporting the same, said sub-sill being adapted to be swung out from under the end of said bottom when the same is being knocked down, and a movable frame engaging the opposite end of said bottom for holding the same in a horizontal plane.

2. In a device of the class described, the combination of a foldable bottom, sides and ends carried upon said bottom, thereby forming an article carrier, means engaging the rear end of said bottom for assisting in holding the same in a horizontal plane, a supporting frame releasably engaging the opposite end of said bottom, said supporting frame comprising a pair of standards having notched upper portions, a sub-sill fixedly mounted upon said notched upper end portions, thereby fixedly securing said standards together, plates carried upon the other end of said standards, said plates having slots formed therein, pins removably fitting within said slots, thereby holding the lower ends of said standards from slipping, U-shaped brackets fixedly mounted upon said bottom, said standards having wedge-shaped projections formed at their upper ends, said wedge-shaped projections removably fitting within said brackets, whereby the brackets will be held from accidentally disengaging the projections, whereby said bottom will be removably held in a substantially horizontal plane.

3. In a device of the class described, the combination of an auxiliary body, said auxiliary body being adapted to be positioned within the body of an automobile, a sub-sill having end plates formed thereon, said end plates having slots formed therein, pins carried by said auxiliary body and passing through said slots whereby said sub-sill will be pivotally mounted upon said bottom, whereby said sub-sill may be swung under one end of said auxiliary body, said sub-sill being adapted to be swung out from under the end of said bottom when so desired, and means releasably engaging the opposite end of said auxiliary body for assisting said sub-sill in holding said auxiliary body in a horizontal plane.

4. In a device of the class described, the combination of an auxiliary body, said auxiliary body being adapted to be positioned within the body of an automobile, a sub-sill having end plates formed thereon, said end plates having slots formed therein, pins carried by said auxiliary body and passing through said slots whereby said sub-sill will be pivotally mounted upon said bottom whereby said sub-sill may be swung under one end of said auxiliary body, said sub-sill being adapted to be swung out from under the end of said bottom when so desired, and a frame releasably engaging the opposite end of said auxiliary body for assisting said sub-sill in holding said auxiliary body in a horizontal plane.

5. In a device of the class described, the combination of an auxiliary body, means engaging the rear end of said auxiliary body for assisting in holding the same in a horizontal plane, a supporting frame releasably engaging the opposite end of said auxiliary body, said frame comprising a pair of standards having notched upper portions, a sub-sill fixedly mounted upon said notched upper portions, plates carried upon the opposite ends of said standards, said plates having slots formed therein, pins removably fitting within said slots thereby holding the lower ends of said standards from slipping, U-shaped brackets fixedly mounted upon said auxiliary body, said standards having wedge-shaped projections formed at their upper ends, said wedge-shaped projections removably fitting within said brackets, whereby said frame will be held from accidentally disengaging said auxiliary body.

6. In a device of the class described, the combination of a body, means engaging one end of said body for assisting in holding the same in a horizontal plane, a supporting frame releasably engaging the opposite end of said body, said supporting frame comprising standards, a sub-sill carried by the upper portions of said standards, plates carried upon the lower portions of said standards, said plates having slots formed therein, and pins removably fitting within said slots thereby holding said standards from slipping.

7. In a device of the class described, the combination of a body, means engaging one end of said body for assisting in holding the same in a horizontal plane, a supporting frame releasably engaging the opposite end of said body, said supporting frame comprising standards, a sub-sill carried by the upper portions of said standards, plates carried upon the lower portions of said standards, said plates having slots formed therein, pins removably fitting within said slots thereby holding said standards from slipping, and means for releasably holding the upper portion of said frame in engagement with said body.

8. In a device of the class described, the combination of a body, means engaging one end of said body for assisting in holding the same in a horizontal plane, a supporting frame releasably engaging the opposite end of said body, said supporting frame comprising standards, a sub-sill carried by the upper portions of said standards, plates carried upon the lower portions of said standards, said plates having slots formed therein, pins removably fitting within said slots, thereby holding said standards from slipping, and means carried by said body and engaging the upper ends of said standards for holding said frame in releasable engagement with said body.

9. In a device of the class described, the combination of a body, means engaging the rear end of said body for assisting in holding the same in a horizontal plane, a supporting frame engaging the opposite end of said body for supporting the same, said frame comprising standards, a sub-sill carried thereby and engaging said body, and means for holding the lower ends of said standards from slipping.

10. In a device of the class described, the combination of a body, means engaging the rear end of said body for assisting in holding the same in a horizontal plane, a supporting frame engaging the opposite end of said body for supporting the same, said frame comprising standards, a sub-sill carried thereby and engaging said body, means for holding the lower end of said standards from slipping, and means carried by said body and engaging the upper ends of said standards in releasable engagement with said body.

11. In a device of the class described, the combination of a body, means engaging the rear end of said body for assisting in holding the same in a horizontal plane, a supporting frame engaging the opposite end of said body for supporting the same, said frame comprising standards, a sub-sill carried thereby and engaging said body, means for holding the lower ends of said standards from slipping, U-shaped brackets carried by said body, the upper ends of said standards extending into said brackets, whereby said frame will be held from accidentally disengaging said body.

12. In a device of the class described, the combination of a body, means engaging the rear end of said body for assisting in holding the same in a horizontal plane, a supporting frame engaging the opposite end of said body for supporting the same, said frame comprising standards, a sub-sill carried thereby and engaging said body, means for holding the lower ends of said standards from slipping, brackets carried by said body, said standards having wedge-shaped upper ends, said wedge-shaped upper ends removably wedging within said brackets thereby holding said frame against accidentally disengaging said body.

13. In a device of the class described, the combination of an auxiliary body, said auxiliary body being adapted to be positioned within an automobile body and rest upon the seat thereof, a sub-sill movably mounted upon one end of said body and resting upon the seat of the automobile, and a frame releasably engaging the opposite end of said auxiliary body and fitting within the automobile thereby holding said auxiliary body in a horizontal plane.

In testimony whereof I hereunto affix my signature.

JOHN MORTIMER AUSTIN.